June 20, 1967 R. P. SANDOR 3,325,890
METHOD FOR INSERTING A THREADED FASTENER INTO A WORKPIECE
Original Filed March 14, 1963
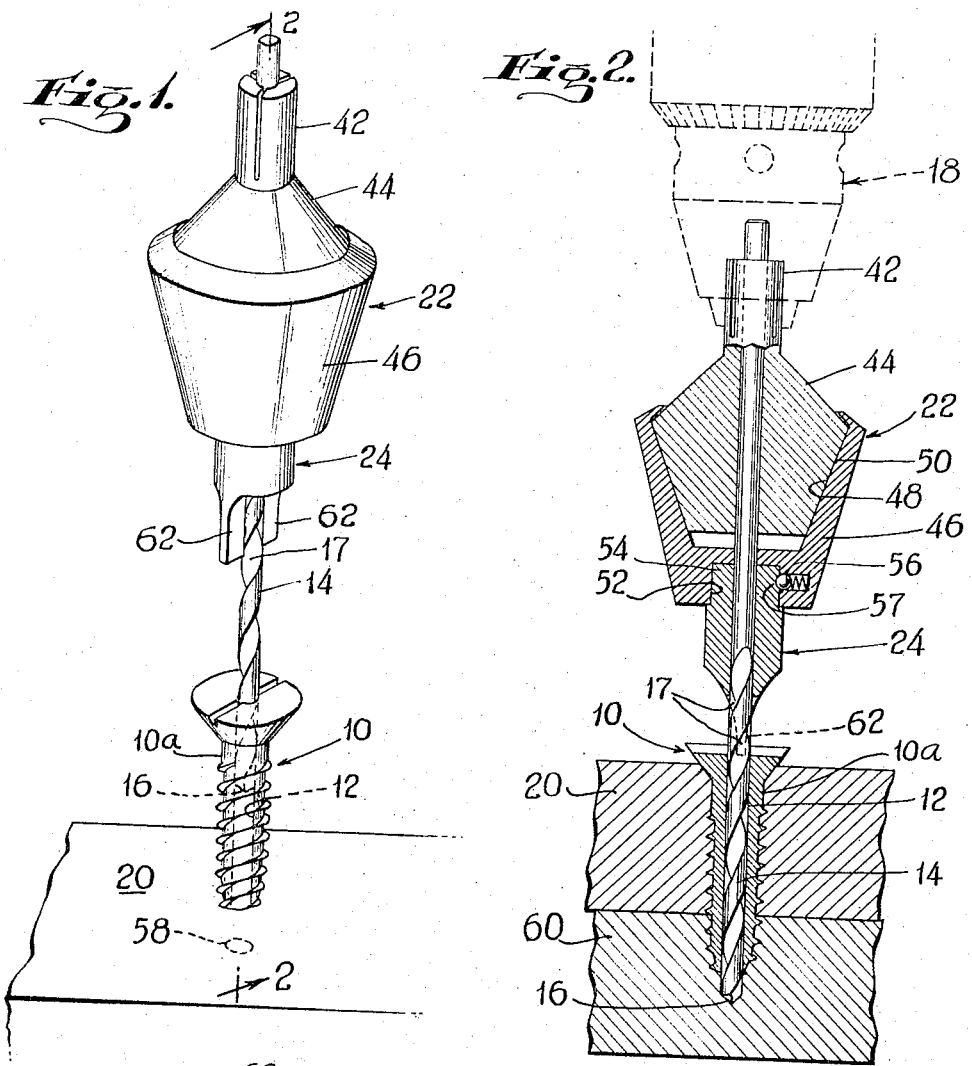
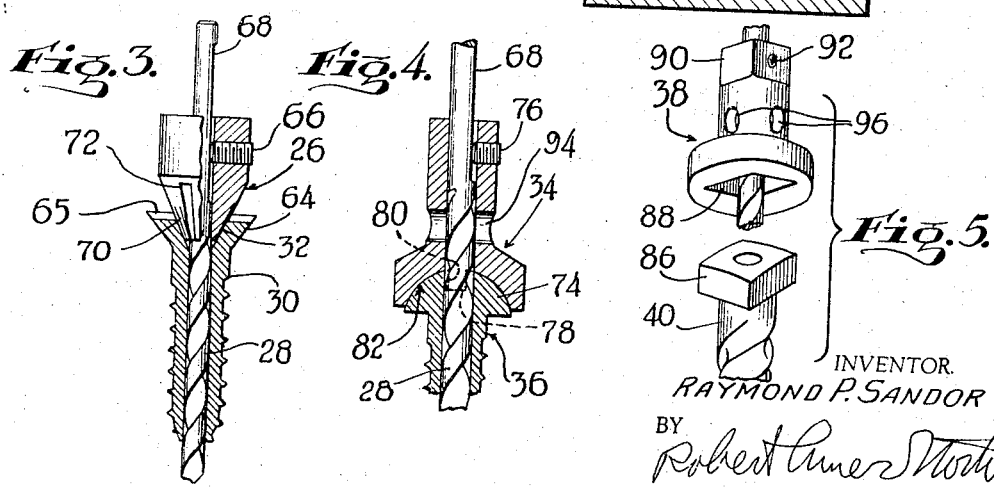
INVENTOR.
RAYMOND P. SANDOR
BY Robert Ames Norton
ATTORNEYS

United States Patent Office 3,325,890
Patented June 20, 1967

3,325,890
METHOD FOR INSERTING A THREADED
FASTENER INTO A WORKPIECE
Raymond P. Sandor, 21 Cherry St.,
Darien, Conn. 06820
Original application Mar. 14, 1963, Ser. No. 265,137, now Patent No. 3,289,290, dated Dec. 6, 1966. Divided and this application July 13, 1966, Ser. No. 564,838
3 Claims. (Cl. 29—432)

This invention is a division of my copending application Ser. No. 265,137, filed Mar. 14, 1963, now Patent No. 3,289,290. It relates to methods for inserting a threaded fastener into a work piece. More particularly the invention relates to a method in which a threaded fastener having a longitudinal opening is fastened into a work piece with a drill bit extending through the longitudinal opening beyond the end of the fastener and boring a hole in the work piece while the fastener is being driven into the hole by the same rotary motion employed for drilling the hole.

Prior art techniques for inserting threaded fasteners have generally required two separate operations. First a hole for the fastener is drilled and then the drill must be removed to permit the fastener to be inserted. In some instances self-drilling fasteners have been used but these have limited applications. The material of the screw must be quite hard to penetrate a metal workpiece and such properties add to the cost of the screw. A further problem encountered with self-drilling fasteners is that it is sometimes difficult to secure them into the material along the desired line. Still another problem is that the material to be fastened tends to split or crack when the self-drilling fastener is driven into it. This is particularly true in wood, plastic, or like material.

Accordingly, it is an object of the invention to provide a threaded fastener that can be installed while a fastener hole is being drilled.

Another object of the invention is to provide methods and apparatus for installing a threaded fastener more rapidly and with less effort than heretofore possible.

A further object of the invention is to provide methods for securing fasteners of the above character.

Another object of the invention is to provide apparatus for carrying out the above methods and for securing fasteners of the above character.

Other objects of the invention will in part be obvious and will in part appear hereinafter.

The invention accordingly comprises the several steps and the relation of one or more of such steps with respect to each of the others, the apparatus embodying features of construction, combinations and arrangement of parts which are adapted to effect such steps, and the articles which possess the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view of a preferred embodiment of the invention;

FIGURE 2 is a sectional side view taken along lines 2—2 of FIGURE 1 illustrating the invention in operation;

FIGURE 3 is a side view in partial section of another embodiment of the invention wherein the screw is frictionally driven into place;

FIGURE 4 is a side view in section of another embodiment of the invention wherein the fastener is rotated at the same rate as the drill, illustrated with a round head screw; and FIGURE 5 is a perspective view of another embodiment of the invention wherein the fastener is driven into place by engagement with a mating socket.

As shown in FIGURES 1 and 2 the invention generally comprises a threaded fastener or screw 10 having a central longitudinal hole 12 formed therein to allow passage of a drill bit 14 therethrough. The screw is positioned along the drill bit so that the cutting end 16 of the drill bit protrudes from the end of the screw. As the drill chuck 18 is brought down, the drill bit cuts an undersized hole in the workpiece 20. With added downward pressure from the chuck 18, the clutch 22 transmits rotary force to the screw driving member 24 to thread the screw into the drilled hole. As more downward force is applied, the clutch 22 applies more torque to the driving member 24 to drive the screw into the drilled hole. When the screw is fully driven into place, the chuck is elevated to withdraw the drill bit 14 and screw driving member 24 from the screw.

In the embodiment shown in FIGURE 3, a conical driving member 26 is secured to the rotated drill bit 28 to apply driving torque to the screw 30 by wedging and friction against the funnel-shaped opening 32 in the screw head. Thus in the embodiments shown in FIGURES 1–3, the drill bit may be rotated at a higher speed than the screw as it is driven, since a slipping clutch action is provided between the screw and the source of rotary power.

In some applications, it may be desirable to rotate the drill and screw driving member at the same speed. For this operation, as shown in FIGURE 4, the driving member 34 is secured directly to the drill bit 28 to drive the round head screw 36 directly as the bit cuts the hole.

The embodiment shown in FIGURE 5 illustrates a screw driving member 38 in the form of a socket for driving a lag bolt 40 or the like. The driving socket member 38 as shown can be used with the clutch arrangement shown in FIGURE 2 and is inserted in place of the blade type screw driving member 24.

The invention will now be described in more detail. Referring to FIGURES 1 and 2, it will be seen that the screw 10 with its longitudinal axial hole 12 accommodates the drill bit 14 through the screw center for drilling an undersized hole in a workpiece 20. The drill bit 14 is preferably directly driven by a chuck 18 and may be secured in the segmented portion 42 of the driving member 44 of the clutch 22. Thus driving member 44 and drill bit 14 are directly driven by the chuck 18. The drill bit 14 can be vertically adjusted within the driving member 44 and drill chuck 18 to have its end 16 protrude the desired length from the end of the screw. The driven member 46 of the clutch 22 has an inner clutching surface 48 for driving contact with the clutching surface 50 on driving member 44 and has a squared female socket 52 for receiving the male end 54 of screw driving member 24. A spring biased ball 56 retains the member 24 in the female socket 52 by engagement with detent 57 in the male end 54.

In operation, an apertured screw 10 is slipped over the drill bit 14 and is engaged with the blades 62 of driving member 24. The screw driving member 24 can be made as a permanent magnet to hold the screw by magnetic force in engaged driving position as the drill bit is being positioned and while initially cutting the hole. Where desired, other suitable holding devices can be employed to hold fasteners, such as brass screws, which are unaffected by magnetic force in driving engagement with the driving member 24 while the hole is started by the drill bit.

With the screw positioned on the drill bit and engaged by the screw driving member 24, the drill chuck is lowered to bring the cutting end 16 of the drill into contact with the workpiece 20 at the desired spot 58 (FIGURE 1). As downward pressure is applied to the chuck 18, the drill will cut into piece 20, which may be of wood. As the drill bit penetrates the wood, further pressure on driving member 44 of the clutch 22 will cause rotary force to be transmitted to the driven member 46 of the clutch, rotating the screw driving member 24 to drive the screw into the drilled, undersized hole. Thus as the screw is driven into place, it is preceded by the drill bit end 16 which continues to cut the hole through workpiece 20 and into piece 60 (FIGURE 2) to be joined thereto. Chips cut from the workpieces 20 and 60 by the drill bit are carried out of the hole by the bit and discharged along the bit exposed shank portion 17. Once the screw is driven into place the chuck 18 is raised to withdraw the blades 62 and the drill bit 14 from the screw.

The present invention is suited also for use in automatic fastener installing equipment (not shown). For such automatic operation, the screws can suitably be carried aligned in a magazine or the like movable with a drill bit and screw driving member. At each position where a screw is to be installed, the drill bit and driving member move forward and pick up a screw from the magazine. Continued forward motion engages the drill bit with the workpiece and installs the screw. Thereafter, the drill bit and driving member are withdrawn and positioned, with the screw magazine, to install the next screw.

Referring now to FIGURE 3, it will be seen that the screw 30 can be provided with a funnel-shaped opening 32 in the interior of the head 64. In this embodiment of the invention the conical driving member 26 is secured by set screw 66 to a flat surface 68 on the drill shank. The screw driving member 26 thus rotates at the same speed as the drill bit and can be positioned at various points along the drill shank depending upon the length of the screw being used.

In operation, the conical screw driving member 26 acts as the driving member of a clutch and may be knurled or roughened on its surface 70 to provide more positive engagement with the funnel-shaped surface 32 of the screw head when downward pressure is exerted on the drill chuck. The member 26 is preferably made with several circumferentially-spaced sections to provide openings 72 for the discharge of chips which are passed up through the screw during drilling.

In the FIGURE 3 embodiment a hole is begun by the drill bit 28, and as the hole progresses into the workpiece, further pressure causes driving engagement of the surface 70 with the funnel-shaped surface 32 of the screwhead to drive the screw into the undersized hole. When the screw is driven into place, the drill bit is withdrawn which also retracts the screw driving member 26. The funnel-shaped surface 32 also facilitates an initial engagement of the drill bit end through the screw and is particularly advantageous when the screws are fed automatically from a magazine as pointed out above. To facilitate withdrawal of the screw 30, the head 64 can also be slotted as indicated at 65.

Referring now to FIGURE 4, it will be seen that the screw driving member 34 can in some instances be rotated at the same speed as the drill bit, depending upon the material of the workpiece and the relationship of the pitch of the screw thread and drill. In this embodiment a screw 36 having a round head 74 is driven into place as the hole is cut by the bit 28. Screw driving member 34 is secured to the flat surface 68 of the drill shank by set screw 76, and drives the screw by blades 80 which protrude from the underside of the rounded cavity 82 and engage the slot 78.

As shown in FIGURE 5, a lag bolt having a polygonally-sided head 86 is driven by driving member 38 provided with a female socket 88 at its bottom. The upper portion of screw driving member 38 is a male socket 90 having a detent 92 for insertion into the driven member 46 of clutch 22 as shown in FIGURE 2. In this embodiment the lag bolt 40 is driven in a manner similar to that described above for the embodiment shown in FIGURES 1 and 2.

The fastener driving members 34 and 38, respectively shown in FIGURES 4 and 5, are provided with holes 94 and 96 respectively through which the chips cut by the drill bit are discharged.

For installing fasteners in brittle workpieces, including some woods, the present invention can advantageously be practiced with fasteners, as the screw 10 of FIGURES 1 and 2, having an unthreaded intermediate shank portion 10a whose diameter is slightly less than the maximum diameter of the threads. With this fastener shape, the hole "cut" in the workpiece 20 by the fastener threads has substantially the same diameter as the fastener shank portion 10a. As a result, there is substantially no tendency for the workpiece to split when the fastener is installed.

The insertion of a threaded fastener according to the invention conserves time and labor. Both the hole forming and screw driving members are driven simultaneously, and preferably by the same rotary motion, with maximum efficiency and ease. Single tool operation also provides for great flexibility and adaptability to automated assembly lines and the like. Moreover, the invention is suited for installing various fasteners such as sheet metal screws and wood screws and can be used with a wide variety of materials.

It will thus be seen that the objects set forth above, among those made apparent from the preceding description, are efficiently attained and, since certain changes may be made in carrying out the above process, in the described articles, and in the constructions set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

I claim:
1. A method for installing a threaded fastener into a workpiece comprising the steps of:
   (a) drilling a fastener hole with a power actuated rotating drill bit passing axially through the threaded fastener, the head end of the fastener having a surface mated with a surface of a member rigidly attached to the drill bit above its end, the two surfaces forming a slippable friction clutch,
   (b) gradually engaging the two said surfaces to permit initial slippage and final driving of the fastener with the rotation of the drill bit to threadably insert the fastener into the hole while it is being drilled.

2. A method according to claim 1 in which the fastener at its head end has a central inverted conical surface and the mating surface on the member rigidly attached to the drill bit is also conical, the drill bit and fastener being gradually pushed together to engage the surfaces to permit initial slippage.

3. A method according to claim 1 in which the fastener head has a rounded convex surface and the member rigidly attached to the drill bit has a mating surface and the drill bit is gradually pushed against the fastener to gradually engage the two surfaces, permitting initial slippage.

References Cited

UNITED STATES PATENTS

| | | | |
|---|---|---|---|
| 1,260,154 | 3/1918 | Day | 85—45 |
| 2,157,216 | 5/1939 | Pollard. | |
| 2,267,925 | 12/1941 | Johnston. | |
| 2,458,391 | 1/1949 | Lavietes | 85—45 X |
| 2,659,255 | 11/1953 | Bates. | |
| 2,705,030 | 3/1955 | Koffler et al. | |

CHARLIE T. MOON, *Primary Examiner.*